United States Patent [19]

Cope

[11] 4,055,999

[45] Nov. 1, 1977

[54] TENSION TESTER FOR TENNIS RACKET STRINGS

[76] Inventor: James R. Cope, 10500 Cherokee Lane, Leawood, Kans. 66108

[21] Appl. No.: 753,643

[22] Filed: Dec. 23, 1976

[51] Int. Cl.[2] .............................................. G01L 5/06
[52] U.S. Cl. ..................................................... 73/145
[58] Field of Search ........................... 73/145, 144, 143

[56] References Cited

FOREIGN PATENT DOCUMENTS

| 652,262 | 12/1964 | Belgium | 73/144 |
| 567,476 | 3/1924 | France | 73/145 |

*Primary Examiner*—James J. Gill
*Assistant Examiner*—Anthony V. Coarlante
*Attorney, Agent, or Firm*—Schmidt, Johnson, Hovey & Williams

[57] ABSTRACT

A device for determining the string tension in the netting of a racket has a base and clamping structure adapted to be intercoupled on opposite faces of the netting, and a compressible, spring-loaded plunger slidably mounted on the base for shifting movement against one face of the netting. Movement of the plunger against the face of the netting deflects the latter and also compresses the plunger such that an equilibrium position is reached wherein the compression force on the plunger spring is equal to the resistance force presented by tension in the strings of the racket netting. A tension gauge is provided for measuring the deflection of the netting at the equilibrium point and translating the deflection measurement into a tension reading corresponding substantially to the actual tension in the racket strings.

10 Claims, 8 Drawing Figures

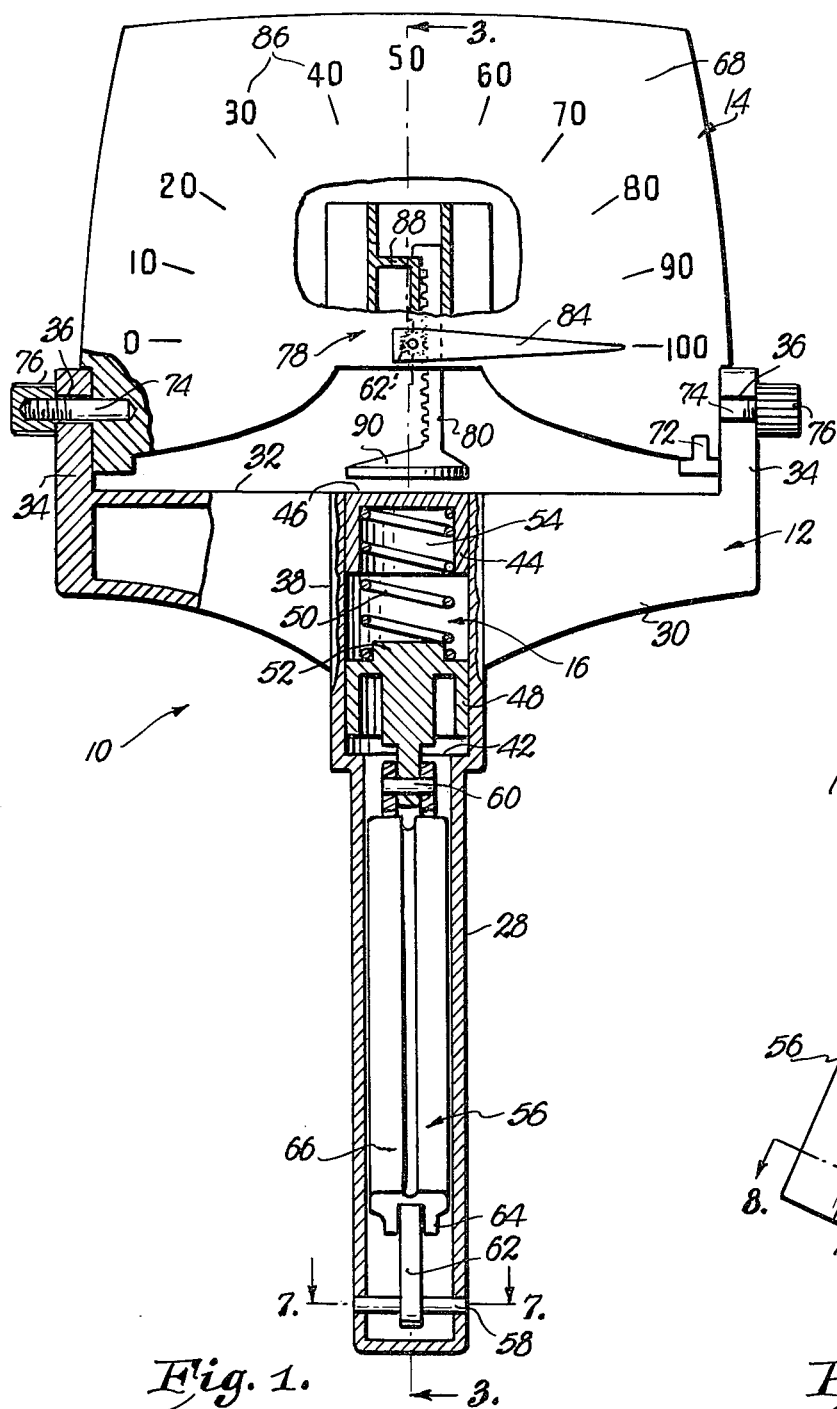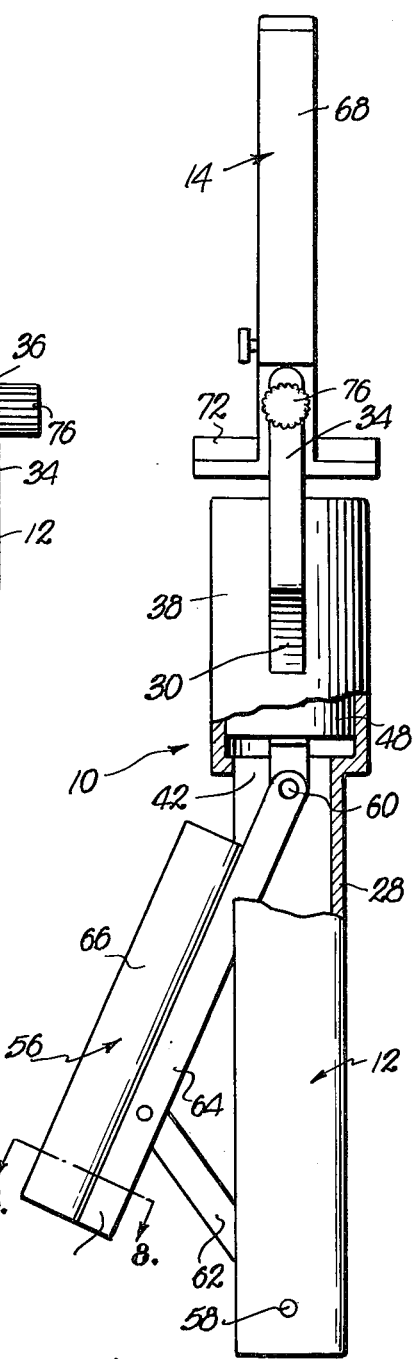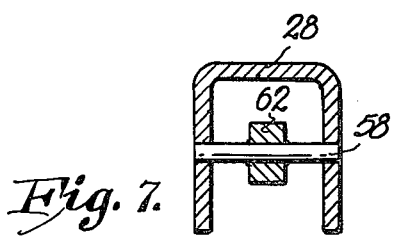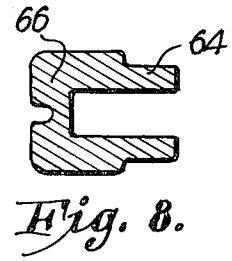

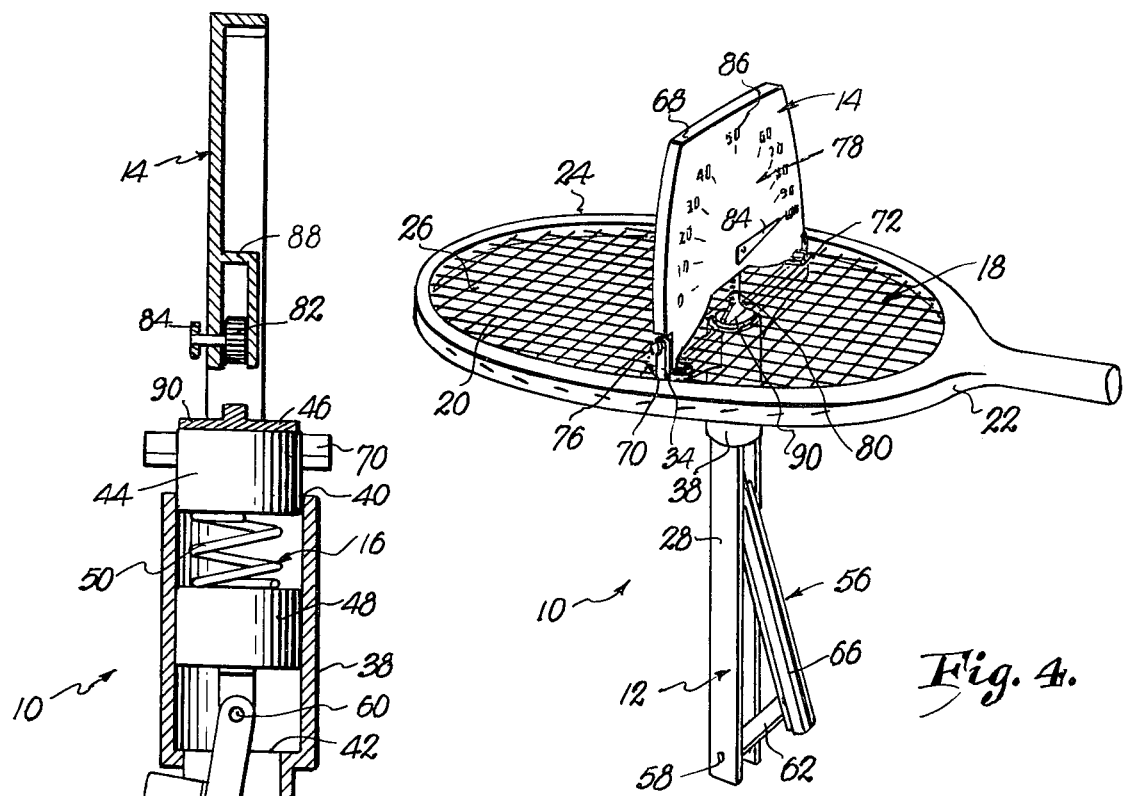
Fig. 3.
Fig. 4.
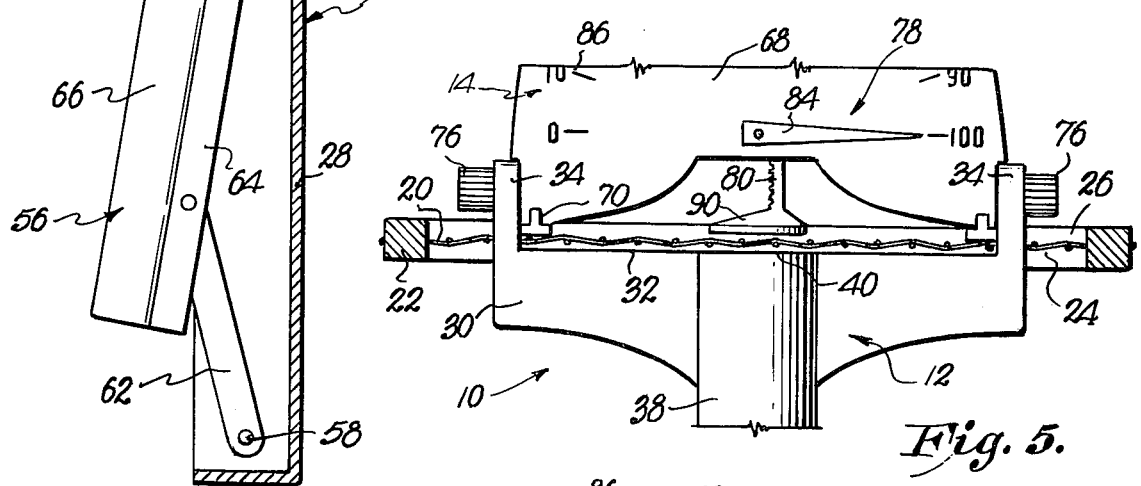
Fig. 5.
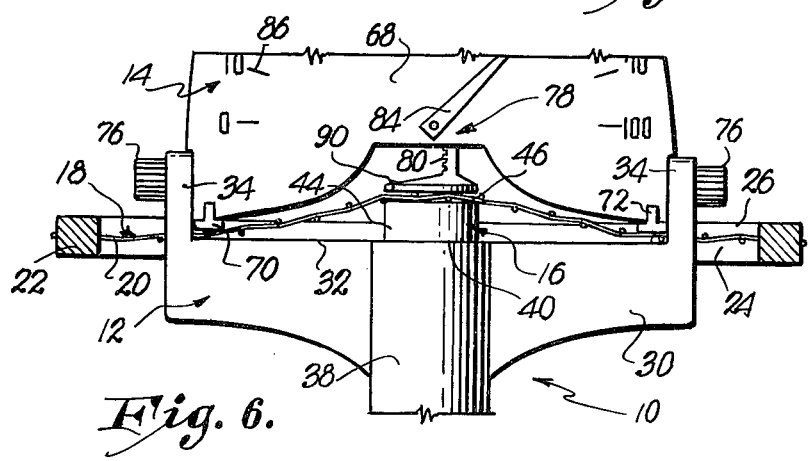
Fig. 6.

TENSION TESTER FOR TENNIS RACKET STRINGS

This invention relates to tension measuring devices in general and particularly concerns a tension tester adapted for measuring the tension in tennis racket strings and the like.

The recent substantial increase in the popularity of tennis and other racket-type games has resulted in an accompanying boom in the industries supplying and servicing rackets. Particularly, a notable increase in demand has been experienced in racket restringing, probably for the reason that rackets today are very expensive and they are used more actively than ever before. Thus, rather than simply purchasing a new racket when the strings become worn, more and more players are having their rackets restrung to salvage an otherwise useless racket.

One problem experienced in the racket restringing art relates to duplicating the original string tension so that the racket owner does not experience a significant change in the playing characteristics of his racket after it has been restrung. This problem is particularly significant since few racket owners know the string tension of their rackets even though this tension value is extremely critical in providing a player with a racket suited to his ability and style of play. Moreover, there has heretofore been no device available for determining the tension in the strings of a racket after it leaves the stringing machine. Hence, the racket stringer has no way of precisely duplicating the original string tension when it is time to restring the racket.

Accordingly, it is an important object of the present invention to provide a device for determining the tension in tennis racket strings even after the racket has been removed from the stringing machine.

It is yet another important object of the present invention to provide a racket string tension tester wherein no part of the tester comes into contact with the racket frame.

It is another important object of the instant invention to provide a tension tester for tennis racket strings wherein a spring-loaded plunger is pushed against one face presented by the racket strings for deflecting the strings in relation to the amount of tension therein.

It is a further important object of my invention to provide a tension tester for tennis racket strings wherein portions of the device are disposed on opposite sides of the netting defined by the racket strings and structure projects through the netting for intercoupling the opposed portions of the device.

In the drawings:

FIG. 1 is a front elevational view of a tension tester constructed in accordance with the principles of the present invention and having portions thereof shown in cross-section;

FIG. 2 is a side elevational view of the tension tester having portions thereof broken away for clarity;

FIG. 3 is a cross-sectional view taken along line 3—3 of FIG. 1;

FIG. 4 is a perspective view of the tension tester shown positioned ready for a tension reading on a tennis racket;

FIG. 5 is a partial, front elevational view of the device shown emplaced on a tennis racket and illustrating the plunger in its neutral position;

FIG. 6 is a partial front elevational view of the device shown positioned on a tennis racket and illustrating the plunger extended in a tension-measuring position;

FIG. 7 is a cross-sectional view taken along line 7—7 of FIG. 1; and

FIG. 8 is a cross-sectional view taken along line 8—8 of FIG. 2.

In FIG. 1 there is shown a tension-testing device 10 including a base 12, clamping structure 14 releasably coupled with the base 12, and a spring-loaded plunger 16 slidably supported on base 12 for movement toward and away from clamping structure 14. As shown for example in FIG. 4, the device 10 is intended to be emplaced on the netting 18 defined by strings 20 of a tennis racket 22 in such a manner that the base 12 is positioned against one face 24 of the netting 18, while the structure 14 is positioned against the other face 26 of the netting 18.

The base 12 presents a generally T-shaped configuration having an elongate, hollow handle 28 depending from a rigid crosspiece 30. The crosspiece 30 has an elongate, substantially flat edge 32 facing away from handle 28 and adapted for emplacement against the face 24 of racket 22. A pair of legs 34 are positioned on opposite ends of the crosspiece 30 and extend upwardly beyond the edge 32, each leg 34 having a transversely extending notch 36 for a purpose to be described hereinbelow.

The base 12 further includes an elongate, hollow barrel 38 positioned at the juncture between crosspiece 30 and handle 28 and in axial alignment with the latter. The barrel 38 has an open end 40 positioned adjacent edge 32 and an opposed open end 42 in communication with the hollow handle 28.

The plunger 16 is supported within barrel 38 for rectilinear movement along a path of travel extending parallel to axes of the handle 28 and barrel 38. Plunger 16 includes a cylindrical face-engaging section 44 adapted for movement in and out of open end 40 and having a generally circular, outermost contact surface 46. The end of plunger 16 remote from section 44 has a substantially cylindrical slide section 48 axially aligned with the section 44. A resilient section in the form of a coil spring 50 extends between the sections 44 and 48 such that the plunger 16 is itself compressible when resistance to movement is encountered at surface 46. Spring 50 is retained in axial alignment with the sections 44 and 48 by virtue of its engagement with a cylindrical boss 52 on section 48 and a cylindrical recess 54 in section 44.

Movement of plunger 16 relative to base 12 is effected by mechanism defining a toggle linkage 56 pivotally secured at one end to base 12 by a pin 58 and similarly supported at its opposite end to plunger 16 by a pin 60. The linkage 56 includes a pair of rigid links 62 and 64, the latter of which presents a grip 66 to facilitate forcible actuation of the linkage 56.

It is to be understood that operation of toggle linkage 56 serves to move the plunger 16 along its rectilinear path of travel. Thus for example, as shown in FIG. 2, when the linkage 56 is in its retracted position, plunger 16 is carried entirely within the barrel 38 having no portion extending beyond the open end 40. On the other hand, as shown in FIG. 3, when the linkage 56 is moved to its extended position, the plunger 16 is caused to move relative to barrel 38 and base 12 such that the face-engaging section 44 passes through end 40 and beyond edge 32. It will be appreciated that when the linkage 56 is fully extended, the slide section 48 of plunger 16 is disposed at a fixed position within the barrel 38, and accordingly, the face-engaging section 44 likewise is disposed at a fixed position. Note however, that should resistance be encountered at surface 46, the plunger 16 will compress such that while slide section 48 remains in its fixed position, the position of face-engaging section 44 is dependent upon the force encountered by surface 46. It is this feature of the device 10 that enables it to measure the tension in strings 20.

The clamping structure 14 essentially comprises a flat plate 68 having a pair of spaced, coplanar, face-engaging pads 70 and 72 adapted to be positioned in contact with the face 26 of netting 18. A pair of threaded pins 74 project outwardly from plate 68 immediately adjacent respective pads 70 and 72. The pins 74 are arranged to engage the notches 36 of legs 34 when the device 10 is positioned on racket 22 with the legs 34 of base 14 projecting through the netting 18. With this arrangement there is presented coupling means whereby the structure 14 may be selectively coupled with the base 12 to preclude relative movement between the latter when operating the device 10. The coupling means further includes a pair of threaded caps 76 cooperably engageable with threaded pins 74 for maintaining the selective coupling between the structure 14 and base 12.

The plate 68 carries a tension gauge 78 having a rack 80 supported over surface 46 for rectilinear movement in a direction parallel to the movement of plunger 16, and a corresponding pinion 82 in mesh with rack 80 and supporting a needle 84 for movement through an arcuate path of travel. Gauge 78 includes a dial on plate 68 comprising a plurality of spaced, raised numerals 86 sequentially arranged in an arc and representing graduated tension values. It will be appreciated that rectilinear movement of the rack 80 effects rotation of the pinion 82 and hence swinging movement of the needle 84 along the dial presented on plate 68. As shown in FIG. 1, there is provided a stop 88 which prevents the rack 80 from separating the structure 14, and additionally, rack 80 has a lowermost foot 90 adapted to be positioned directly over surface 46 when the device 10 is properly emplaced on the racket 22.

At this point, the relationship between the spring 50 and the gauge 78 should be further described in order to clearly explain the invention. From the foregoing description it will be appreciated that when plunger 16 is pushed to its outermost fixed position by the extension of linkage 56, the netting 18 will be deflected. In addition, plunger 16 will be partially compressed due to compression of spring 50 in response to resistance against deflection of netting 18. Manifestly, netting 18 will resist deflection in direct relationship to the amount of tension in strings 20 such that the compression of spring 50 is inversely related to the tension in strings 20. Accordingly then, gauge 78 and spring 50 are coordinated such that the tension reading given by gauge 78 for a certain deflection of netting 18 (and corresponding compression of spring 50) coincides with the actual tension in the strings 20.

In use, the operator first positions the device 10 on a racket 22 in a manner shown in FIG. 4. This is accomplished by initially separating structure 14 from base 12, positioning base 12 against face 24 such that legs 34 project upwardly through netting 18, and then emplacing structure 14 against face 26 in such a manner that pins 74 are captured within respective notches 36. In order to secure the device 10 in its tension-testing position, the operator preferably screws the threaded caps 76 onto their respective pins 74.

Once the device 10 has been properly emplaced, the operator merely depresses grip 66 to extend linkage 56 and hence push plunger 16 against face 24 of the netting 18. Such movement will cause deflection of the netting 18 as well as compression of the plunger 16 in a manner similar to that described and shown, for example, in FIG. 6.

The deflection of netting 18 will be sensed by tension gauge 78 through movement of rack 80 thereby causing indicator needle 84 to move to a position along its arcuate path of travel. The operator simply views the position of needle 84 to determine the tension in the strings 20 of netting 18.

The present invention offers a relatively inexpensive means for testing the string tension in rackets prior to restringing of the latter. This highly desirable function is accomplished without engaging the racket frame in any way and consequently, there is virtually no possibility of damaging the racket itself.

The tension tester of the present invention can be used at any time such that racket string tension may be measured long after the racket is removed from the stringing machine. Additionally, since it is unnecessary to cut or otherwise destructively operate on the racket strings, the testing device of the present invention also can be used to check the string tension in new rackets if so desired.

Having thus described the invention, what is claimed as new and desired to be secured by Letters Patent is:

1. A device for measuring tension in the strings of the netting in a tennis racket or the like, said netting presenting a pair of opposed faces, said device including:
   a base adapted to be positioned against one of said faces;
   clamping structure adapted for emplacement against the other of said faces;
   securement means for releasably coupling said structure to said base when the structure and base are positioned against their respective said faces;
   a plunger shiftably mounted on said base for movement toward and away from a fixed position wherein said plunger projects outwardly from said base in a direction toward said structure;
   mechanism on said base for forcibly shifting said plunger to said fixed position when said base is coupled with said structure whereby said plunger is pushed against said one face and said strings are deflected toward said structure;
   said plunger including an elastic section adapted to yield proportionately to resistance against movement of the plunger such that said deflection of the strings is inversely related to the tension in said strings; and
   a tension gauge on said clamping structure for sensing the deflection of said strings and translating said deflection into a string tension measurement.

2. The invention of claim 1, said structure including a pair of spaced, coplanar, face-engaging pads for abutment against said other face when said structure is coupled with said base, said plunger being normally disposed equidistant from said pads.

3. The invention of claim 2, said securement means including a pair of spaced, outwardly extending legs on said base adapted to project through said netting when the base and structure are coupled together.

4. The invention of claim 3, said legs each being provided with a retaining notch, said structure including a pair of rigid pins arranged for engagement with respective notches.

5. The invention of claim 4, the spacing between said legs being substantially equal to the spacing between said pads, each of said pins being positioned immediately adjacent a respective pad.

6. The invention of claim 1, said plunger including a cylindrical face-engaging section at one end and an opposed, slide section at the other end, said slide section being operably coupled to said mechanism, said elastic section being disposed between said face engaging section and said slide sections.

7. The invention of claim 1, said plunger being supported for movement along a rectilinear path of travel.

8. The invention of claim 7, said elastic section comprising a coil spring axially aligned with said path of travel.

9. The invention of claim 7, said gauge including a rack and pinion, said rack extending parallel to said path of travel.

10. The invention of clam 1, said mechanism comprising a toggle linkage extending between said base and said mechanism.

* * * * *